United States Patent [19]

Hageniers

[11] Patent Number: 4,705,395

[45] Date of Patent: Nov. 10, 1987

[54] TRIANGULATION DATA INTEGRITY

[75] Inventor: Omer L. Hageniers, Windsor, Canada

[73] Assignee: Diffracto Ltd., Windsor, Canada

[21] Appl. No.: 657,261

[22] Filed: Oct. 3, 1984

[51] Int. Cl.$^4$ .............................................. G01C 3/00
[52] U.S. Cl. ....................................... 356/1; 356/375
[58] Field of Search .......................... 356/1, 375, 376; 73/1 R; 354/402, 403, 162, 163

[56] References Cited

U.S. PATENT DOCUMENTS

| | | | |
|---|---|---|---|
| 4,310,227 | 1/1982 | Znchok | 356/1 |
| 4,334,150 | 6/1982 | Herbst et al. | 354/402 |
| 4,373,804 | 2/1983 | Pryor et al. | 356/1 |
| 4,523,101 | 6/1985 | Tsunekawa | 354/402 |

*Primary Examiner*—L. T. Hix
*Assistant Examiner*—David M. Gray
*Attorney, Agent, or Firm*—Larson and Taylor

[57] ABSTRACT

Disclosed is an improved electro-optical triangulation distance sensing method and apparatus incorporating a reference detector to detect light returned from an object surface and so control light power, integration time (or other characteristic) of the primary image sensing photodetector. Ideally the reference detector is the same size as the primary photodetector and positioned effectively to see the same image of a zone of light projected on the object surface. Also disclosed are useful calibration methods for such sensors.

13 Claims, 5 Drawing Figures

TRIANGULATION DATA INTEGRITY

BACKGROUND

This case describes a method for utilizing a reference detector such that a proper light power level and light viewing area of a photo detector array is maintained on a surface when triangulation data is obtained. Central to this invention is the use of a reference detector such as a photodiode (eg. a UDT PIN6-D) whose length (area) is the same or less than the length (or area) of a linear (or matrix) photo detector array (or other image position sensing photodetectors such as a UDT SC-10 analog type) used to determine spot, line or other zone position projected onto a part surface and imaged onto the array. Typical arrays are the Reticon 256G (linear) and GE TN2500 (matrix).

Use of such a reference detector allows the presense of the surface to be found from the output of the detector and the linear sensor movement axis (or axes) slowed down so that the measurement can occur. This is for rapid advance toward a part surface where the diode array scan rate would not be fast enough to precisely catch the point in question. This also provides the best possible compensating signals for the array since the array is looking at the same zone on the part that the reference detector sees. These compensating signals are used to maintain a substantially constant amount of energy on the array and thereby allow consistent readout of spot or other zone image position independent of surface reflectivity, scattering properties, etc.

Finally, when the reference detector is smaller than the array, one can assure that the spot or line image has to be on the detector array completely before the reference detector picks it up.

The invention is contained in the following embodiments:

Figure 1:
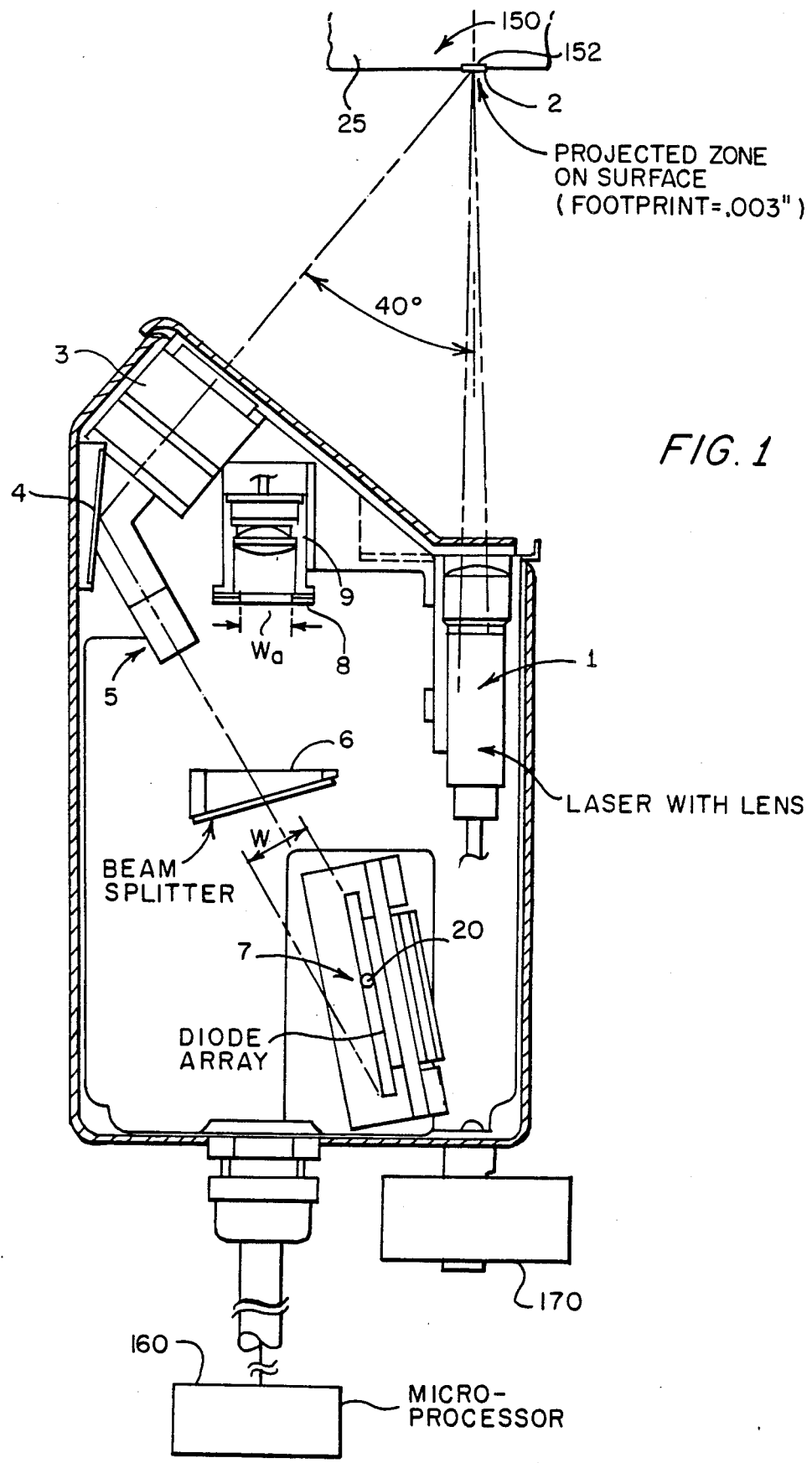
FIG. 1 illustrates a basic sensor embodiment of the invention.

The basic triangulation sensor layout of the invention is shown in FIG. 1. U laser source 1, projects on an object surface 25, a spot or other zone 2, and light from the surface is received by a lens train consisting of lenses 3, mirror 4 and lens 5.

The transmitted light then passes through a beam splitter 6, where it is imaged to form spot 20 on a self scanning photo detector array 7. The important features of the invention as mentioned here are the fact that the light which is reflected by the beam splitter goes to a reference detector (sometimes also called a secondary detector) 9, after passing through a aperture 8. In one preferred embodiment of the invention the distance between the beam splitter and the detector array is desirably made the same as the distance between the beam splitter and the aperture thereby allowing both elements to effectively lie in the same focal plane of the optical train.

Typically, magnifications of 2 to 5 times are employed, which coupled with tilt usually provided in the placement of the detector array relative to the lens axis, cause a magnification of 3 to 5:1 on the detector array.

The effective width of the reference detector is made equivalent to that of the array by use of an aperture 8 whose width, $w_a$, is equal to the effective width w of the array in the image plane. Note that 'w' is often less than the array length as many such sensors are operated with the array tilted as shown to improve magnification and other performance characteristics.

Figure 2:
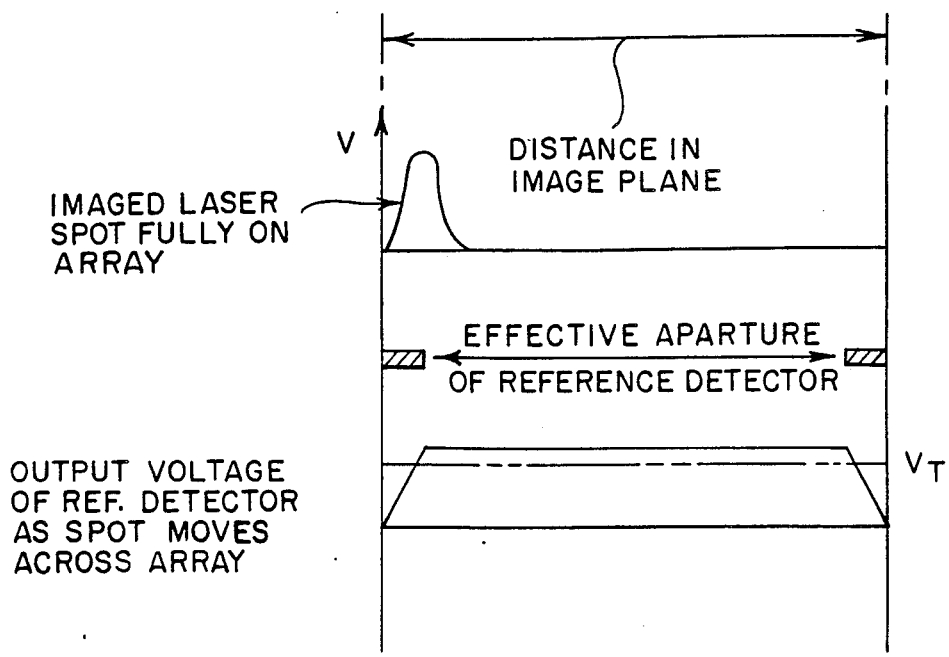
FIG. 2 illustrates an output of the reference detector as a function of range.

The advantage of doing this is that the reference detector can then be used to give a signal or a voltage output from the received light which gives an indication that the data is currently valid. In other words, the light spot which is imaged from the surface on the diode array is fully there and fully valid at any time that the output from the reference detector exceeds a certain value. A typical output is shown in FIG. 2.

Often it is desirable to use a detector or aperture of width $w_a$ somewhat less than that 'w' of the array to insure the imaged spot is fully on the diode array. The width $w_a$ of the aperture is chosen so that its signal can be used to reliably enable the readout of the array to preclude reading when the image spot is on either end of the array where there is a danger that the zone image sensed would be slightly erroneous (by falling off the end of the array) and thus result in improper array data. It has also been found to be generally of importance that the effective height of the reference detector (or its aperture) also approximate that of the primary photodetector array. Thus the reference detector sees a true representation of what the array sees (or possibly a little less, for safety using $w_a$ or height smaller than the array).

Figure 3:
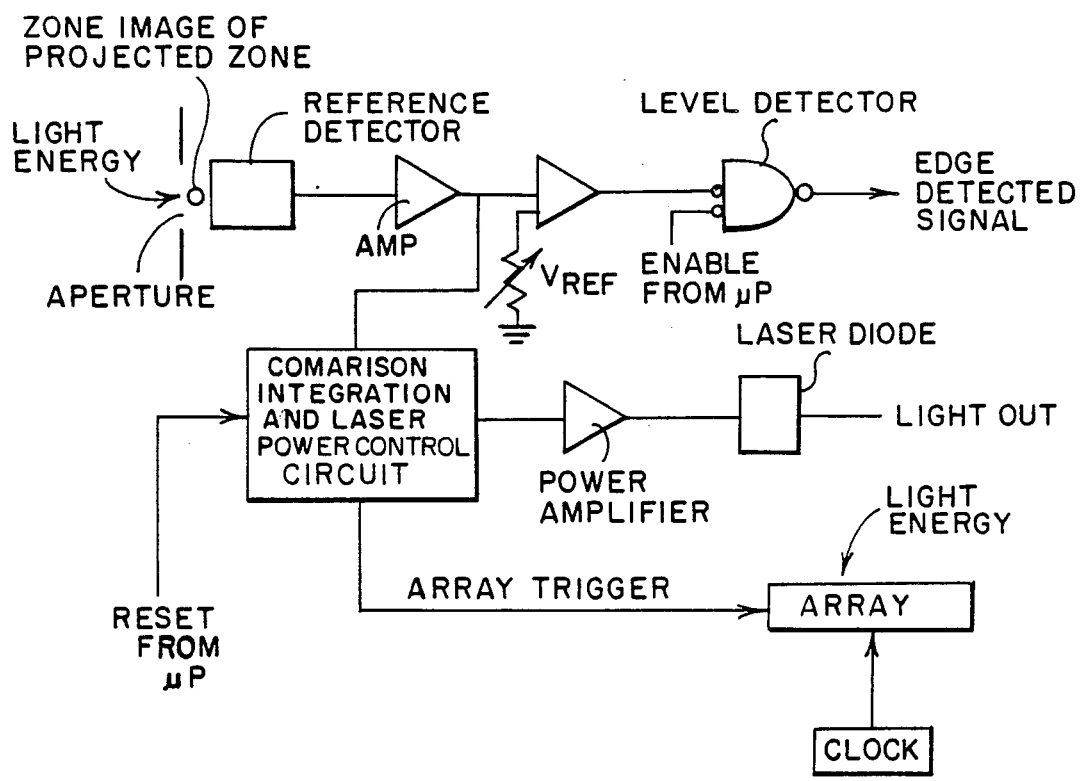
FIG. 3 illustrates a basic control diagram.

The various elements of the laser and diode array control circuit are shown in FIG. 3. The voltage output from the reference detector is amplified and put through a level detector which is used as an edge detector or in range detector if the proper signal is present from the microprocessor 160 (FIG. 1). The signal is also sent to a laser power control circuit where the amount of light received is used to keep the laser power on until a preset threshold is reached at which point the laser power is turned off. A that time a strobe signal is generated to trigger the detector array readout.

The uses of the secondary detector are threefold. The first as described above, is to provide a signal which indicates the amplitude of the returned light signal. This amplitude and its integration over time can be used to give a trigger signal to synchronize the scan of the diode array so that scans are made only when adequate light has been received to get a fully developed but non-saturated output from the diode array.

A second area of usage is to indicate when the light beam has struck the surface. For example, in the edge detector mode, if that surface has an edge or sensor and the corner is being mechanically scanned at right angles say to the outgoing light beam, as soon as the light hits the part, returning any light is detected it can be used as a trigger signal to indicate that the edge of an object is there in space. With a small beam size, eg. 0.003", resolution of edge location can be 0.0005" or better, which is quite desirable. In this mode of operation the laser diode is left on at full power until an edge is located or the microprocessor initiates an abort command (such an abort command, to shut down a machine scan cycle for example), is often provided if on scanning, the sensor sees no object for a given time in a region where such an object or feature thereof should be).

This is illustrated in FIG. 1 where the object 25 for illustration contains surface 150 (dotted lines) whose edge 152 has just been struck by spot 2 as the sensor is moved to the left in the figure relative to the object. The resultant hardware trigger signal can be used to latch the instantaneous reading of position from a glass scale encoder for example that is monitoring the right to left movement of the sensor.

Figure 4:
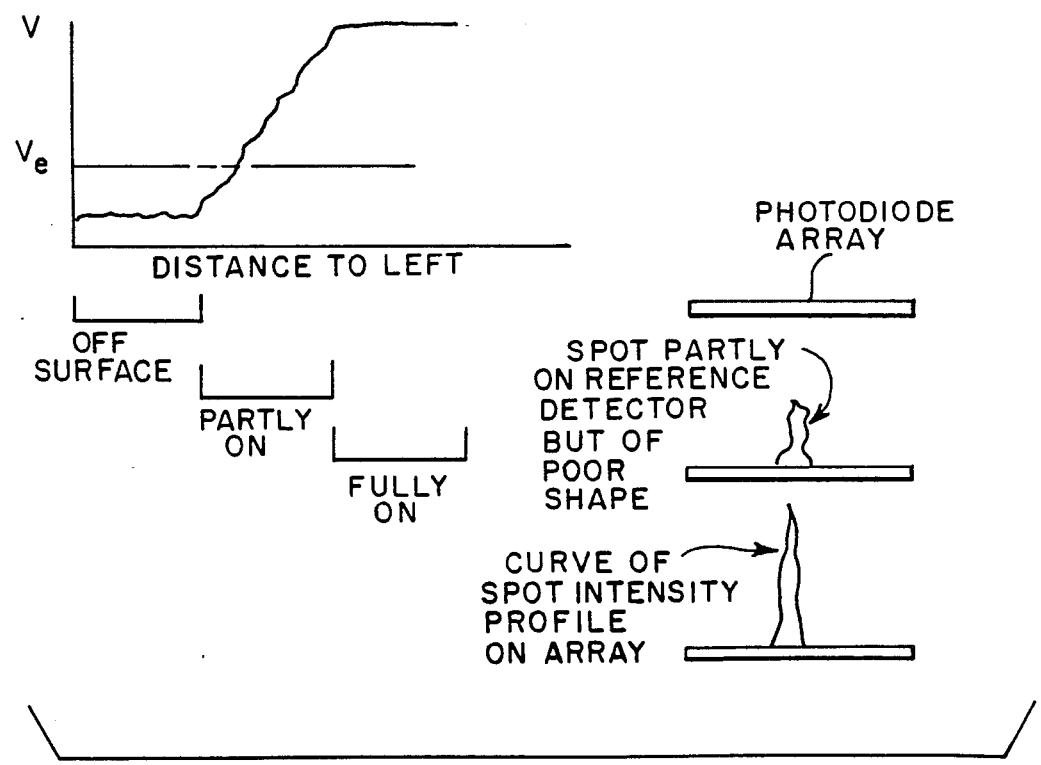
FIG. 4 illustrates reference detector output as the sensor approaches the edge of a surface.

FIG. 4 illustrates the electrical output of the reference detector as this situation occurs and the corresponding appearance of the spot on the primary detector array (or the reference detector for that matter). When the first signal is obtained (crossing voltage threshold $V_e$), the coordinate of the machine axis 170 moving said sensor is noted and the edge of part 150 is assumed to lie at that location. The location of surface 2, having the edge is then determined when the projected zone is fully on the surface and the array has been enabled.

The third area of usage is on coordinate measuring machines or other applications, where the sensor head is often moved toward the surface (vertical direction in FIG. 1). As soon as the surface comes into the measuring field of view of the triangulating sensor, the reference detector gets an adequate signal to trip a high speed solid state logic circuit indicating it has just entered the reasonable measuring range of the detector array. As noted, this may be less than the total range due to edge effects, lens errors at range extremes or the like.

Due to the non-linear nature of the relationship between detector array counts and movement of the surface relative to the triangulation sensor, it is necessary that a means of calibration be established in order to allow the output of the sensing triangulation sensor to be linear with movement of the surface. In order to accomplish this, a technique has been devised whereby a multi-order fit of several calibration points taken by moving the surface in known increments can be established.

Figure 5:
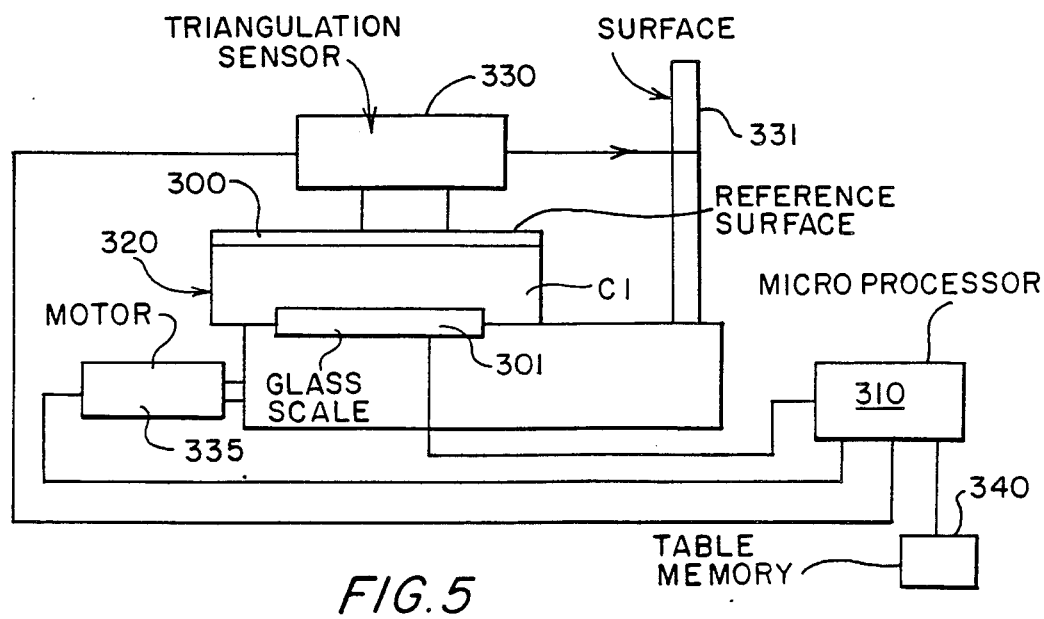
FIG. 5 illustrates a calibration method using multi order equation fits according to the invention.

The technique employed, shown in FIG. 5, is to mount a reference surface 300 on a glass scale 301 or other accurately encoded table 320 and to synchronize that table input with the microprocessor 310 used to linearize the output of triangulation sensor 330 measuring distance to surface 331 via motor 335. The table is moved through several steps whose number may typically vary from 3 to approximately 50 and these points are then used to get a calibration curve via a least squares fit, the most normal choice being a polnomial of third order.

Once the sensor has been taken through the calibration and the appropriate polnomial coefficients have been determined, then the system is structured such that the diode array reading is used to operate in a look up table fashion for readout. In other words, the polonomial is precalculated for each of the possible diode array outputs and the calibration factor for that array reading stored in a table memory 340. Then, when the sensor is used, and an actual calibrated reading is required, the diode array reading (counts or other), for example 512 counts, is used as an address in the lookup table to provide a quick answer for the resultant calibration factor. This is an important feature and has the advantages of operating at very high speed as compared to numerically evaluating the polyonomial for each particular diode array output at the time an answer is needed. The lookup memory is typically included with the sensor controller, or built right into the sensor housing.

The calculation of the polynomial fit for the test data taken on the calibration setup and the resulting table of points on this fitted line, also results in an elimination of noise in that small glitches or "flyspecks" in the output are essentialled filtered out in the calibration table best fit process. Typicall, third or even fourth order polynomial fits have been used for this purpose.

Figures 6, 7:
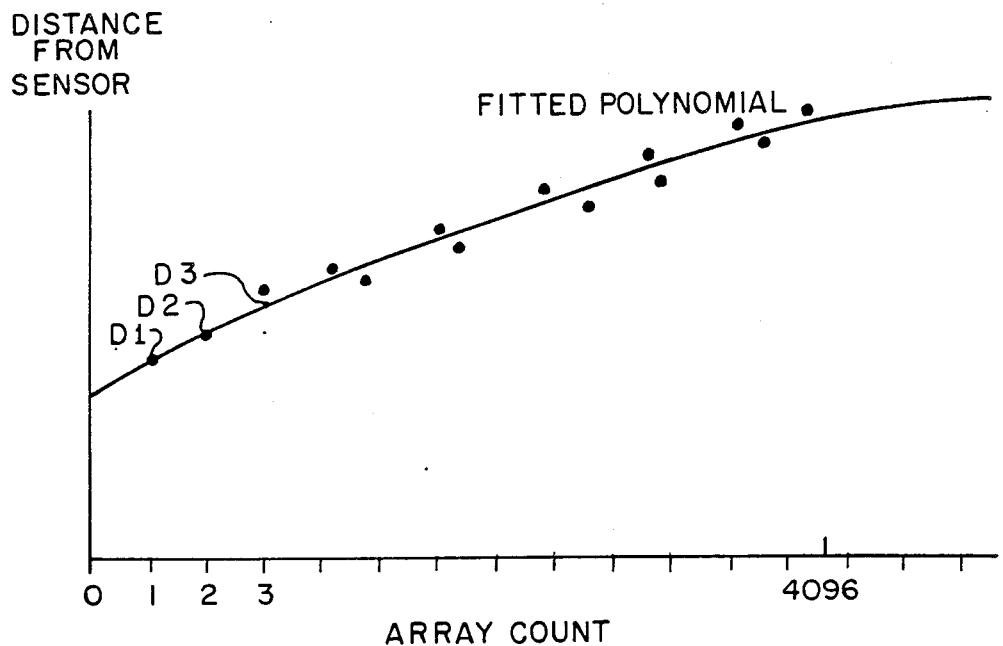

FIG. 6 illustrates the situation. Distance values $D_1$, $D_2$, $D_3$ are stored for each of the array counts which can be seen (typically such counts are resulted from multiplications in the centroid finding techniques which give electronically enhanced outputs. These 4096 counts could easily be generated from a 1025 element array.

The above technique is fast and accurate but requires a large table as each count is stored with its corresponding distance value. 8K memory in the microprocessor is typical.

A smaller table of values can be used if piece-wise interpolation is used.

An alternate calibration method is called the piece-wise linear fit where several discrete points of diode array reading vs actual position are obtained during calibration and subsequently the corrected reading is obtained by interpolation as $$\text{Actual position} = T(x) + \frac{(Y - Q)}{Z}(T(x+1) - T(x))$$

where $T(x)$ is the corrected position value at the array count calibration point just below the array reading Y.

$T(x+1)$ is the corrected position value at the array count calibration point just above the array reading Y.

Z is the number of array counts between the two calibration points $T(x)$ and $T(x+1)$.

Q is the array reading corresponding to the calibration value $T(x)$.

In use, this is handled by the sensor microprocessor when an array output count Y is determined. A look up table such as FIG. 7 of specific detector array counts is created in the calibration process together with corresponding actual distance readings. In the field, the sensor microprocessor then reads the nearest values for counts stored on either side of the test value and performs the above interpolation then.

What is claimed is:

1. An electro-optical system for determining distance to a surface, said system comprising:
   (a) an electro-optical triangulation sensor comprising:
      (i) a light source for projecting a light beam onto the surface;
      (ii) a light detector means for receiving the light reflected from the surface when the light beam is projected thereon and for producing an output in accordance therewith; and
      (iii) means responsive to the output of said light detector for determining the distance to the surface;
   (b) a reference detector means for independently sensing the light reflected from said surface when the light beam is projected thereon and for producing an output in accordance therewith; and
   (c) control means, responsive to the output of said reference detector means, for controlling an operating characteristic of said triangulation sensor based exclusively on the output of said reference sensor.

2. Apparatus according to claim 1 wherein said characteristic is the light power level of the light source.

3. Apparatus according to claim 1 wherein said reference detector means comprises a photodetector array.

4. Apparatus according to claim 1 further comprising further control means for initating a reading of said electro-optical triangulation sensor only when the light level detected by said reference detector means is above a given thereshold.

5. Apparatus according to claim 1 further comprising control means for indicating the presence of an edge of an object when a given output from said reference detector means is produced.

6. Apparatus according to claim 1 wherein the triangulation sensor and said reference detector means are arranged so that an image of a zone projected by said light source onto the surface of the object falls on the reference detector means and the light detector means over substantially the same range of measurement.

7. Apparatus according to claim 6 wherein said reference detector means subtends approximately the same angular width or less of the image movement as does the light detector means of said triangulation sensor.

8. Apparatus according to claim 6, wherein the height of said reference detector means approximates that of said light detector means.

9. Apparatus according to claim 1 wherein said control means comprises power control means for said light source for providing power to the light source until a preset light level threshhold is reached.

10. Apparatus according to claim 9 further comprising means for initiating a read-out of the output of said light detector means when said preset threshold is reached.

11. Apparatus according to claim 1 wherein said light detector means comprises a scanning photodetector array and said system further comprises control means for integrating the amplitude of the output of said reference detector means over time and for producing a trigger signal for controlling scanning of said photodetector array such that scans are made only when adequate light has been received by the array to produce a fully developed but non-saturated output.

12. Apparatus according to claim 1 wherein said reference detector comprises an object presence detector for detecting the presence of the object and for controlling the operation of the triangulation sensor in accordance therewith.

13. Apparatus according to claim 12 wherein said object presence detector provides for shutting down of the operation of the triangulation sensor if no object is detected for a given time in a region where the object should be located.

* * * * *